(12) United States Patent
Lanning et al.

(10) Patent No.: US 8,757,368 B2
(45) Date of Patent: *Jun. 24, 2014

(54) RECTANGULAR SWITCHGRASS BALES PRODUCED AT HIGH DENSITY FOR OPTIMIZED HIGHWAY TRANSPORT ON SEMI-TRAILER TRUCKS TO BIOREFINERIES

(71) Applicant: Forest Concepts, LLC, Auburn, WA (US)

(72) Inventors: David N. Lanning, Federal Way, WA (US); James H. Dooley, Federal Way, WA (US); Christopher J. Lanning, Federal Way, WA (US); James L. Fridley, Seattle, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,229

(22) Filed: Apr. 11, 2013

(65) Prior Publication Data

US 2013/0189452 A1    Jul. 25, 2013

Related U.S. Application Data

(63) Continuation of application No. 13/412,899, filed on Mar. 6, 2012, which is a continuation-in-part of application No. 13/195,374, filed on Aug. 1, 2011, now Pat. No. 8,430,025, which is a continuation of application No. 13/013,929, filed on Jan. 26, 2011, now Pat. No. 7,987,777, which is a continuation-in-part of application No. 12/969,125, filed on Dec. 15, 2010, now Pat. No. 7,987,776, which is a continuation of application No. 12/887,916, filed on Sep. 22, 2010.

(51) Int. Cl.
*B65D 71/00* (2006.01)

(52) U.S. Cl.
USPC .......................................................... 206/83.5

(58) Field of Classification Search
USPC ............................ 206/83.5, 524.1; 100/35, 3
See application file for complete search history.

(56) References Cited

U.S. PATENT DOCUMENTS

| | | | |
|---|---|---|---|
| 3,204,582 A * | 9/1965 | De Buhr et al. | 425/461 |
| 4,936,206 A | 6/1990 | Miles et al. | |
| 5,213,030 A | 5/1993 | Bolstad | |
| 5,390,783 A | 2/1995 | Gombos et al. | |
| 6,485,774 B1 * | 11/2002 | Bransby | 426/623 |
| 6,732,774 B1 | 5/2004 | Seckel | |
| 7,877,970 B1 * | 2/2011 | Crosby | 56/10.2 R |
| 8,408,857 B2 | 4/2013 | Kelderman | |
| 8,695,493 B2 | 4/2014 | Lanning et al. | |

(Continued)

OTHER PUBLICATIONS

"Bulk Density of Wet and Dry Wheat Straw and Switchgrass Particles" by P. S. Lam, et al., 8 pages article. (pp. 351-358).*

(Continued)

Primary Examiner — Steven A. Reynolds
(74) Attorney, Agent, or Firm — Thomas F. Broderick

(57) ABSTRACT

Rectangular switchgrass bales optimized for highway transport on semi-trailer trucks, produced by a process of compacting a switchgrass biomass material at between about 22 and about 32 psi into a rectangular switchgrass bale having a bale density of between 14.6 and 20.5 $lb/ft^3$.

3 Claims, 3 Drawing Sheets

(56) References Cited

U.S. PATENT DOCUMENTS

| | | | |
|---|---|---|---|
| 2002/0068118 A1 | 6/2002 | Gombos et al. | |
| 2005/0145115 A1 | 7/2005 | Garcia | |
| 2009/0205307 A1* | 8/2009 | Warren et al. | 56/153 |
| 2010/0304440 A1* | 12/2010 | Medoff | 435/72 |

OTHER PUBLICATIONS

Kemmerer, B.D., and J. Liu, Spring switchgrass harvest with a New Holland large square baler, ASABE Paper No. 1009029, Jun. 21, 2010.

New Holland BB9050, BB9060, BB9070 & BB9080 Operator's Manual, with Addendum supplement to 87474948, Print No. 84174647, 1st edition, English, Aug. 2008.

Miles, T.R., and Miles, T.R. Jr., Densification Systems for Agricultural Residues, Chapter 14 in ACS Symposium Series, No. 130, Thermal Conversion of Solid Wastes and Biomass, American Chemical Society, 1980.

Sokhansanji, S., et al., Large-scale production, harvest and logistics of switchgrass (*Paniculum virgatum* L.)—current technology and envisioning a mature technology, Biofuels, Bioprod. Bioref. 3:124-141, 2009.

Prince, R. P., et al., Shear stress and modulus of elasticity of selected forages, Transactions of the ASAE, pp. 426-429, 1969.

Mohsenin, N.N., Physical properties of plant and animal materials, vol. I Structure, physical characteristics and mechanical properties, Gordon and Breach Science Publishers, NY, pp. 88-90, 93, 103-106, 208-209, 688, and 730.

Sitkei, G., Mechanics of agricultural materials, Developments in Agricultural Engineering (Netherlands), No. 8, Elsevier, 487 p., 1986.

O'Dogherty, A review of the mechanical behavior of straw when compressed to high densities, J. Agric. Engng Res. 44:241-265, 1989.

Wood Handbook—Wood as an engineered material, Forest Products Laboratory, USDA Forest Service, Madison, WI, 2002, pp. 60-61 and 64-65.

Afzalinia, S., Modeling and validation of the baling process in the compression chamber of a large square baler, Ph.D. Thesis, University of Saskatchewan, SK, Canada, May 2005.

Wang, G., et al., Mechanical properties of timothy hay node, ASABE Paper No. RRV-07142, Oct. 2007.

Byers, E., et al., Biomass Automated Densification Device—B A D D, Senior Project in Biosystems Engineering, University of Tennessee, May 2008.

Kaliyan, N., et al., Constitutive model for densification of corn stover and switchgrass, Biosystems Engineering 104(1), Sep. 2009.

Bransby, D., et al. Yield effects on bale density and time required for commercial harvesting and baling of switchgrass, prepared by Oak Ridge National Laboratory, prepared for 7th National Bioenergy Conference, Nashville, Tennessee, Sep. 15-20, 1996.

Shinners, K.J., et al., Drying, harvesting and storage characteristics of perennial grasses a biomass feedstocks, ASABE Paper No. 061012, Jul. 2006.

Planting and growing miscanthus, Best practice guidelines for growing miscanthus under the Bioenergy Scheme (BES), Irish Department of Agriculture, Fisheries & Food, 2009.

Austin, A., Researchers evaluate biomass handling solutions, Biomass Magazine, posted Dec. 16, 2009.

Dooley, J.H., M.S. DeTray, and D.N. Lanning. Mar. 2006. Technology to enable utilization of biomass from wildland-urban interface fuels reduction projects.

Dooley, J.H., M.S. DeTray, D.N. Lanning, J.L. Fridley; Utilization of biomass from WUI fuels reduction—Biomass collection and handling from wildland-urban intermix projects on residential and suburban properties; Poster, May 16, 2006.

Dooley, J.H., J.L. Fridley, D.N. Lanning, M.S. DeTray; Large rectangular bales for woody biomass; Paper No. 068054, presented at the 2007 ASABE Annual International Meeting, Portland, OR, Jul. 9-12, 2006.

Lanning, D.N., J.H. Dooley, M.C. DeTray, and C.N. Lanning; Engineering factors for biomass baler design; ASABE Paper No. 078047, presented at the 2007 ASABE Annual International Meeting, Minneapolis, MI, Jun. 17-20, 2007.

Dooley, J.H., D.N. Lanning, C. Lanning, and M.S. DeTray; Transportation of biomass from wildland urban intermix (WUI)—Biomass preprocessing and handling to reduce cost of transportation and add value; Poster, 2007.

Lanning, D., C. Lanning, J. Dooley, M. DeTray, T. Aristidou; Baling to improve transport of biomass from urban areas; poster presented at the Forest Innovation Conference, Missoula, MT, Apr. 25, 2008.

Dooley, J.H., D. Lanning, C. Lanning, J. Fridley; Biomass baling into large square bales for efficient transport, storage, and handling; paper presented at the Council on Forest Engineering 2008, Jun. 22-25, 2008.

Dooley et al., Square bales of woody biomass for improved logistics, prepared for presentation at the 2009 Society of American Foresters National Convention, Orlando, Florida, Sep. 30-Oct. 4, 2009.

Cundiff, J.S., et al., Harvest Costs for bales of switchgrass in the southeastern United States, Bioresource Technology 56:95-101, 1996.

Bailey-Stamler, S., et al., Assessing the agri-fiber biomass residue resources for creating a BIOHEAT industry in Alberta, Final Report submitted to Alberta Agriculture and Food, May 15, 2007.

ARF07 Project—Optimization of switchgrass management for commercial fuel pellet production, Final Report (Draft Copy), presented to OMAFRA—Alternative Renewable Fuels Research and Development Fund, submitted by Resource Efficient Agricultural Production (REAP)—Canada, Mar. 2008.

Holin, F., Cellulosic ethanol companies request Ag manufacturing expertise, Hay and Forage Grower, Apr. 1, 2009.

Casier, M.D., et al., Grasses and legumes for cellulosic bioenergy, Chapter 12 in: Grassland : quietness and strength for a new American agriculture / Walter F. Wedin and Steven L. Fales, editors. Madison, WI : American Society of Agronomy, Crop Science Society of America, Soil Society of America, c2009., p. 205-219.

Turhollow, Anthony, et al., Cost Methodology for Biomass Feedstocks: Herbaceous crops and agricultural residues, ORNL/TM-2008/105, prepared by Oak Ridge National Laboratory for the U.S. Department of Energy, Dec. 2009.

Groothius, MD, et al., Compaction experiences with bulk-format switchgrass in commercial transfer stations, ASABE Paper No. 110819, Aug. 2011.

International Search Report, mailing date Apr. 16, 2012, in International Application No. PCT/US2011/001344, entitled Engineered Woody Biomass Baling System.

ASAE S269.4 Dec. 1991 (R2007) Cubes, Pellets, and Crumbles—Definitions and Methods for Determining Density, Durability, and Moisture Content.

Sokhansanj, S., and L.O. Pordesimo, Adaptation of forage handling systems for collecting biomass feedstock. ASAE Paper No. 026060, 2002.

Muck, R.E., and K. J. Shinners, Conserved Forage (Silage and Hay): Progress and priorities, Proc. 19th Int. Grassl. Congr., 2001.

* cited by examiner

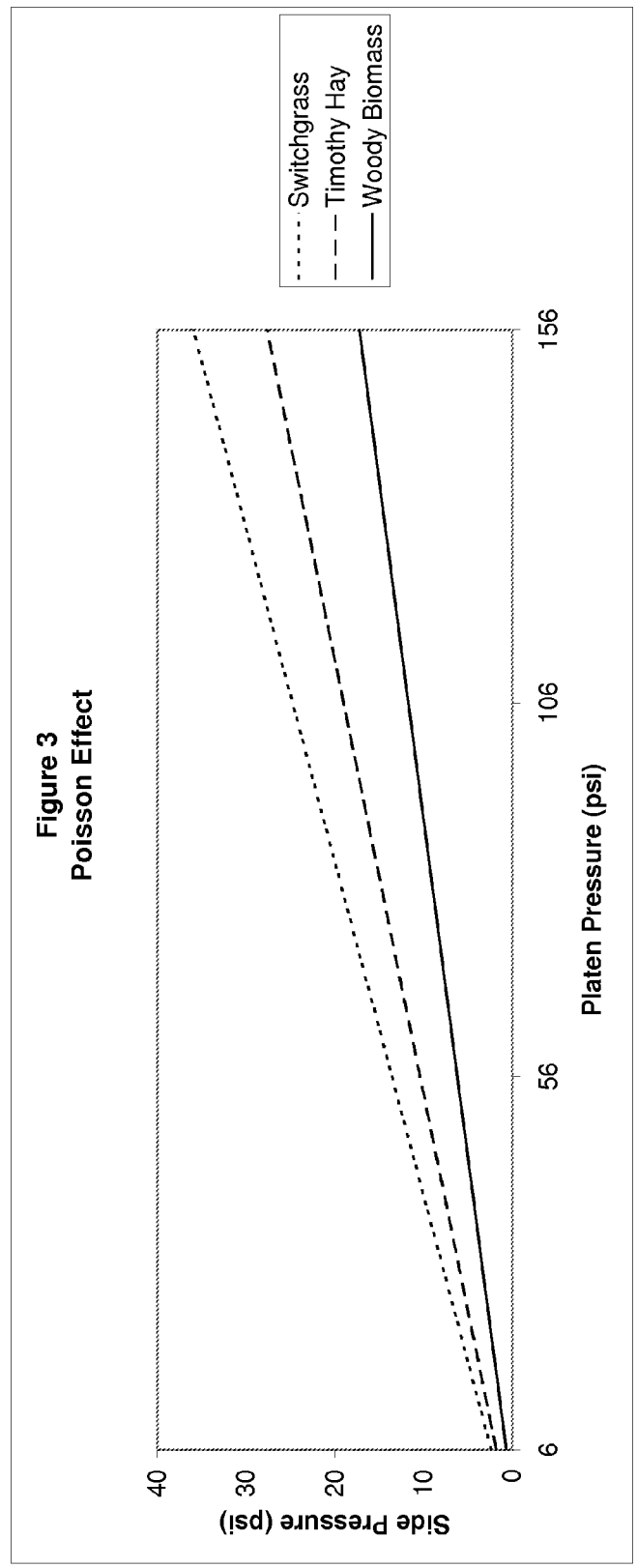

RECTANGULAR SWITCHGRASS BALES PRODUCED AT HIGH DENSITY FOR OPTIMIZED HIGHWAY TRANSPORT ON SEMI-TRAILER TRUCKS TO BIOREFINERIES

STATEMENT OF GOVERNMENT LICENSE RIGHTS

This invention was made with government support by the NIFA Small Business Innovation Research program of the U.S. Department of Agriculture, grant numbers 2005-33610-15483 and 2006-33610-17595. The government has certain rights in the invention.

FIELD OF THE INVENTION

Our invention relates to harvesters, particularly balers, and provides a baling system engineered to produce rectangular bales of tall grass biomass, using a preselected platen pressure to achieve a predetermined bale density, taking into consideration initial moisture content, expected dry-down period, and mode of transportation.

BACKGROUND OF THE INVENTION

The terms "tall grass" and "tall grasses" as used herein refer to switchgrass (*Panicum viratum*), miscanthus (particularly *Miscanthus x giganteus*), big bluestem (*Andropogon gerardii*), Indian grass (*Sorgastrum nutans*), reed canary grass (*Phalaris arundinacea*), and other tall perennial grasses harvested as biomass feedstocks for ethanol production and biorefining.

Tall grass biomass is expected to become a core element of our nation's strategy to replace imported oil and natural gas with renewable resources.

Currently, switchgrass is harvested in large rectangular bales (3×4×8 feet) weighing about 1,100 pounds (11.5 lb/ft$^3$) at about 10 percent moisture (Austin, 2009). For example, a New Holland BB9080 large square baler intended for forage and straw crops reportedly produced switchgrass bales at an average bale density of 181.1 kg/m$^3$ (11.3 lb/ft$^3$) at 80% of the baler's plunger load setting; this baler was said to have the ability to produce switchgrass bales that approach 200 kg/m$^3$ (12.5 lb/ft$^3$) (Kemmerer and Liu, 2010).

The present inventors have reported their progress to develop better methods to collect and transport woody biomass (Dooley 2006; Lanning 2007; Dooley 2008; Dooley 2009). Our continuing goal is to engineer more efficient recovery and highway transport of plant biomass materials to second-generation bioenergy and biofuel plants.

SUMMARY OF THE INVENTION

We have elucidated the three rheological properties of tall grass biomass material requisite to predictably and reproducibly bale tall grass biomass at preselected optimum highway transportation densities while minimizing fossil fuel consumption during baling, handling, and transport.

First, we have empirically determined the baled bulk density (lb/ft$^3$) v. platen pressure (psi) curves for tall grass biomass at various moisture contents. These relationships indicate the target compression platen pressures that will compress tall grass biomass, e.g. whole stalks or billets, to predetermined transport densities.

Second, we have empirically determined that tall grass biomass material compressed to optimum transport densities has a Poisson's ratio effect of about 22%. This value is required to determine the minimum mechanical strength of baling chamber sidewalls, be they fixed or moveable, for producing tall grass biomass bales of optimum transport densities.

Third, we have observed that tall grass biomass material compressed to optimum transport densities has a coefficient of friction against steel baling chamber walls of approximately 0.40. This value is necessary, in conjunction with both the target compression platen force and the Poisson's ratio value, to determine the minimum platen pressure required to form and eject a compacted bale of tall grass biomass from the baling chamber.

These three discoveries permit one of ordinary skill to for the first time calculate the requisite strength of tall grass biomass compression systems and baling chambers, which in turn permits one to manufacture robust, lightweight and economical rectangular balers to produce tall grass biomass bales at high densities optimized for transport on conventional semi-trailer trucks.

Accordingly, the invention provides a biomass baler having a baling chamber adapted to receive tall grass biomass material and a compression system adapted to compact the tall grass biomass material into a parallelepiped bale in the chamber, wherein the baling chamber comprises a front wall consisting essentially of a reciprocating compression platen corresponding in dimensions to the width W and height H of the bale, opposing upper and lower walls corresponding in dimensions to the length L and either of the W and H of the bale, and opposing sidewalls corresponding in dimensions to the L and the other of the W and H of the bale, and wherein the compression system is adjustable by conventional controls to apply at least one operator-selectable compression platen pressure of between 22 psi and 30 psi to the tall grass biomass material in the chamber.

For bale ejection through an open or reversibly opened back chamber wall, the compression system can apply a compression platen pressure of at least $(0.176 \times Pp \times L)(H+W)$ pounds to move a bale of compacted tall grass biomass material from the chamber, wherein Pp is the compression platen pressure expressed in pounds per square inch that the compression system applies to compact the bale in the chamber, and wherein L, H, and W are expressed in inches For bale ejection through a reversibly opened sidewall, the baler has an ejection system adapted to apply a force of at least $(Pp \times W)(0.8H+0.176L)$ pounds to move a bale of compacted tall grass biomass material from the chamber through the opened sidewall, wherein Pp is the compression platen pressure expressed in pounds per square inch that the compression system applies to compact the bale in the chamber, and wherein W, H, and L are expressed in inches.

BRIEF DESCRIPTION OF THE DRAWING

FIG. 3 is a graph that contrasts the Poisson's ratio effects of tall grass biomass (0.22), timothy hay (0.17), and woody biomass (0.11) when baled at optimum transportation densities.

DETAILED DESCRIPTION OF THE PREFERRED EMBODIMENT

The terms "parallelepiped" and "rectangular" are used interchangeably herein to refer to a solid shape bounded by six substantially square or rectangular faces in which each pair of adjacent faces meets in a substantially right angle.

Figure 1:
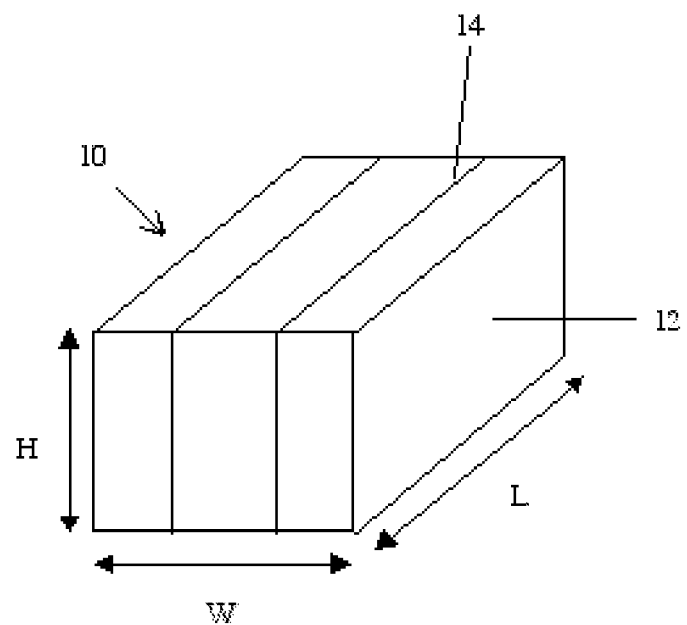
FIG. 1 shows a perspective view of a representative tall grass biomass bale.

The term "bale" as used herein refers to a parallelepiped-shaped bundle of compressed and bound biomass. FIG. 1 depicts a representative bale 10 of compressed tall grass biomass 12 bound with a plurality of loops of binding material 14. Dimension W is perpendicular to the plane created by the binding material that encircles the compressed biomass. Dimension H is perpendicular to W and in line with the binding material. Dimension L is perpendicular to the plane created by W and H. Binding material is parallel to L. Representative binding materials include wire, polypropylene twine, and banding straps. For stackability, bale compression is preferably along the L axis, most preferably with the biomass material disposed substantially along the W axis, transecting the binding material plane.

The term "green weight" as used herein refers to the weight of freshly harvested tall grass biomass that has substantially the same moisture content, reportedly on the order of 44-66 percent wet-weight-basis (% wwb), as the stranding plants. The term "equilibrium weight" refers to the eventual weight of tall grass biomass that has dried in bales under ambient conditions to equilibrium moisture content. "Dry weight" as used herein refers to the weight of tall grass biomass after drying to constant weight at 221° F. (105° C.).

The "net energy content" of tall grass biomass bales is calculated herein in terms of its dry weight organic component (disregarding water content) and with reference to a net energy value of 7,750 Btu per dry weight pound for switchgrass. (Fuel Value Calculator, USDA Forest Products Laboratory, 2004.) For example, a 1,000-pound miscanthus bale at 45% water content is considered to have a net energy content of (((1-0.45)×1,000)×7,750) Btu.

The term "semi-trailer truck" as used herein refers to an articulated rig consisting of a towing engine ("tractor") coupled to a single "semi-trailer" (a trailer without a front axle), or to a "double trailer" consisting of a semi-trailer coupled to either another semi-trailer or a "full trailer" (a trailer supported by front and rear axles), or to a 'triple trailer" consisting of a semi-trailer coupled to two full trailers. As used herein, the term "semi rig" refers to a tractor & semi-trailer combination, commonly a 10-wheeled tractor coupled to an 8-wheeled trailer; and the terms "double rig" and "triple rig" refer to tractors pulling two and three trailers, respectively. The trailers can be flatbed trailers, curtain siders, or box trailers. The term "fleet" refers to a group of semi-trailer trucks owned or operated by a business or government agency.

The overall weight of a particular semi-trailer truck empty of cargo is referred to herein as "curb weight."

The term "cargo" as used herein refers to a plurality or multiplicity of parallelepiped bales of tall grass biomass that are loaded for transport on or in the one or more trailers of a semi-trailer truck. The term "payload" refers to the weight, volume, and density characteristics of the cargo. The terms "payload weight" and "payload volume" refer to the weight and volume of the cargo, respectively.

The term "Gross Vehicle Weight (GVW)" as used herein refers to the total weight of a semi-trailer truck and everything aboard, including cargo. The federal maximum GVW for semi-trailer trucks is 80,000 pounds. Double and triple rigs must additionally comply with the following federal bridge protection formula.

The term "Federal Bridge Gross Weight Formula" as used herein refers to FMCSA regulation §658, which is hereby incorporated by reference in its entirety. This regulation limits the amount of weight that can be put on each of a double or triple rig's axles, and how far apart the axles (or groups of axles) must be to legally carry a given weight, expressed by the formula:

$$W=500\ ((LN/N-1)+12N+36)$$

wherein W is the overall gross weight on any group of two or more consecutive axles to the nearest 500 pounds, L is the distance in feet between the extreme of any group of two or more consecutive axles, and N is the number of axles in the group under consideration.

As used herein the terms "maximum transport volume" and "maximum transport weight" refer to the maximum volume and weight of cargo, respectively, that a particular semi-trailer truck can legally transport. The maximum transport weight is determined by subtracting the curb weight of the semi-trailer truck from the maximum allowable GVW of the truck. The term "optimal transport density" refers to the computed density (weight/volume) of a cargo that has both the maximum legal transport volume and the maximum legal transport weight. Such an optimized cargo is said to "cube out" the legal payload of a semi-trailer truck.

In ordinary circumstances, a tractor-coupled semi-trailer will weigh about 35,000 pounds, leaving about 45,000 pounds of payload capacity. The cargo space available on or in a semi-trailer is normally 48 or 53 feet long and about 8 foot 4 inches wide and 8 foot 10 inches high. These general constraints give an optimal transport density range of 12.7 to 11.5 lb/ft$^3$. In practice, however, maximum transport weight and volume limits depend specifically on a particular semi-trailer truck's curb weight, trailer configuration, and travel route on federal and state highways.

For example, the California Department of Transportation has relatively strict regulations on weight and size limits for highway transportation vehicles. Semi-trailers are limited to 48 or 53 feet maximum length; and each trailer in a double trailer cannot exceed 28 feet 6 inches in length. For illustrative purposes, we describe an optimized bale size and density for cargo transport on a 48-foot semi-trailer in the state of California. Considering payload volume, a 14-foot maximum allowable load height leaves 8 to 9 feet of useable cargo space. We assume an 8-foot cargo height and an 8-foot loading width, leaving buffer spaces for pallets, tarps, and straps. The exemplary volume, then, of cargo that can be transported on a semi-trailer in California (without special permits) is 48 ft×8 ft×8 ft equaling 3072 cubic feet.

With this information we can determine appropriate bale sizes for truck transport of tall grass biomass on California highways. Table 1 lists several suitable bale configurations, sized for different businesses and tall grass biomass sources.

TABLE 1

| Bale size | 48 ft. trailer payload | | |
|---|---|---|---|
| L × W × H (inches) | L × W × H (bales) | # bales | Bale L/W ratio |
| 24 × 16 × 24 | 24 × 16 × 4 | 576 | 1.5 |
| 48 × 32 × 32 | 12 × 3 × 3 | 108 | 1.5 |
| 64 × 48 × 32 | 9 × 2 × 3 | 54 | 2.0 |
| 96 × 48 × 48 | 6 × 2 × 2 | 24 | 2.0 |

For example, 54 tall grass biomass bales sized 64×48×32 inches will cube out the exemplary 3072 ft$^3$ payload volume of a 48-ft semi trailer. To maximize packing efficiency, bale configurations are preferably selected so that trailer dimensions are evenly divisible by bale dimensions. In this example the trailer length is divisible without remainder by the bale length dimension, and likewise trailer width by bale width, and trailer height by bale height.

Tall grass biomass bales should preferably have an L/W and/or L/H ratio(s) of at least 1.5, as smaller ratios tend to produce egg-shaped bales rather than consistently stackable, rectangular bales. Most preferably, L/W and/or L/H ratio(s) of approximately 2 advantageously permit the bales to be stably interlocked on pallets or in stacks. We note that finished bale dimensions will increase by the amount of stretch in the chosen binding material, e.g., polypropylene twine stretches under load more than steel wire. Consequently the baling chamber walls (discussed below) can be sized proportionately shorter (wherein w is the width of the compression platen, h is the height of the compression platen, and /is the length of the chamber), to accommodate the anticipated stretch of particular binding materials.

Figure 2:
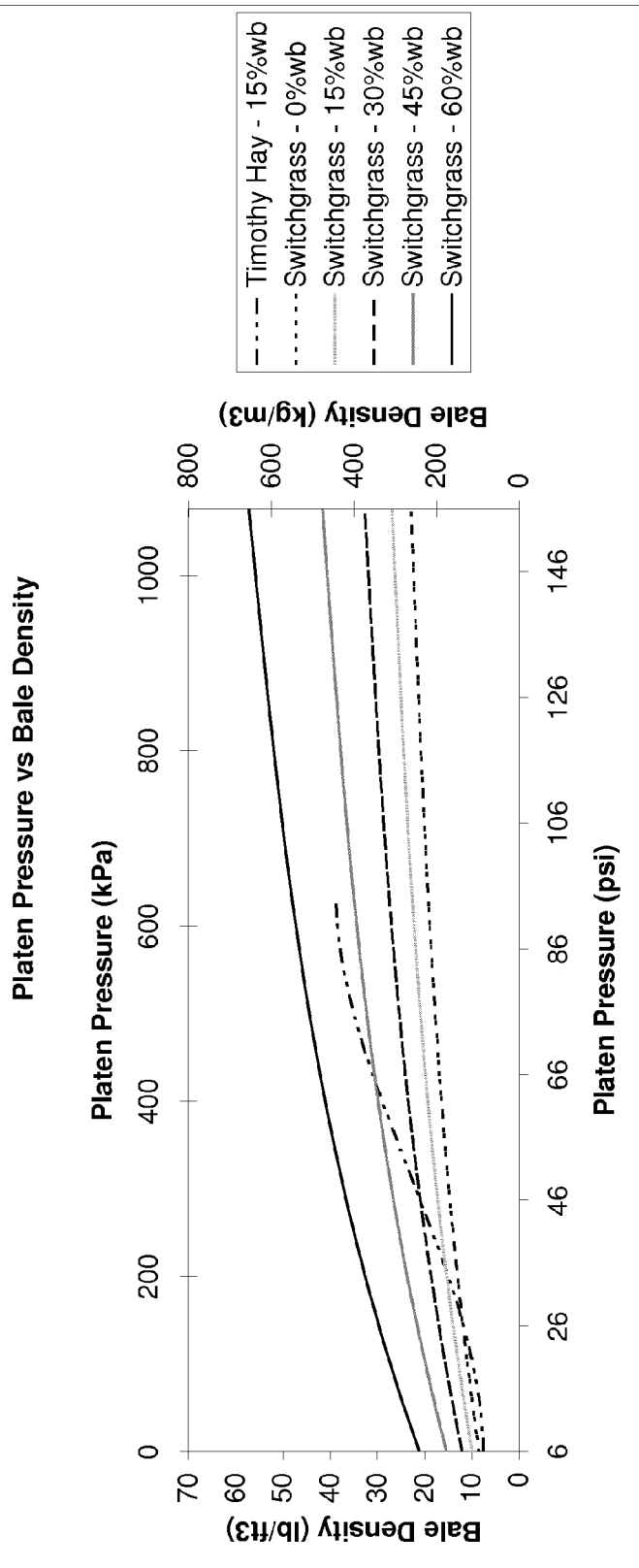
FIG. 2 is a graph that contrasts the platen pressure curves of tall grass biomass (at 60% wwb, 45% wwb, 30% wwb, 15% wwb, and dry weight) and timothy hay (at 15% wwb) when baled at optimum transportation densities.

Considering payload weight, a typical semi rig payload legal in California is 44,000 to 48,000 pounds. Combining these volume and weight constraints gives an optimum transport density range of 14.3 to 15.6 lb/ft$^3$. Assuming a maximum payload weight of 45000 lbs, 54 biomass bales sized 64×48×32 inches with an average green density of 14.6 lb/ft$^3$ will cube out the truck. FIG. 2 indicates that green tall grass biomass (45% wwb) can be compressed to a density of about 14.6 lb/ft$^3$ by a platen pressure force (i.e., baler system pressure applied to the platen times the area of the platen in inches) of about 4 psi. However, transporting such green biomass bales over long distances would be far from optimal, as this green payload would contain some ten tons of non-combustible water. Drying the bales prior to long-haul transport significantly increases the energy content of the biomass payload, but to predictably cube out the truck with dried biomass the green tall grass biomass must be baled at predetermined higher initial densities, for example as shown in Table 2.

will dry down to the maximum payload weight at about 30% wwb. The resulting cargo has a net energy content of about 244 million Btu.

Row 1c indicates that drying green bales down to 15% wwb increases the net energy content of the cargo to about 296 million Btu, provided the green tall grass biomass is initially baled at a proportionally higher density (~20.5 lb/ft$^3$, at ~22 psi) to accommodate the greater water loss during dry down to the predetermined maximum payload weight.

Rows 2a and 2b present similar calculations for late season switchgrass when baled at 30% wwb. Row 3a presents a comparable optimized strategy for baling and shipping switchgrass at 12.5% wwb. For comparison, rows 3b and 3c show how net energy content decreases when switchgrass at 12.5% wwb is baled at suboptimal platen pressures to lower densities.

In this manner, by selectively producing relatively dense tall grass biomass bales for drying to predetermined optimum transport densities, especially by natural evaporation and transpiration under ambient conditions, the long-haul highway transportation and fuel costs per unit energy delivered can be greatly reduced and optimized.

Additional economies can accrue during the baling process by limiting the strength (weight) and power (weight, size, noise, and fuel consumption) of the baler to achieve but not unnecessarily exceed an optimized transport density range selected to accommodate particular biomass types and trailer truck configurations. The experimental data reported herein was acquired in a laboratory scale baler constructed as disclosed in Example 1.

EXAMPLE 1

Laboratory Scale Baler Materials and Methods

Prior to designing and fabricating the bench-top lab baler, our literature review revealed insufficient prior data for the

TABLE 2

| | Bale at _% wwb ship at _% wwb ↓ | Bale Size: 64 × 48 × 32" | | | Baler | 48 foot trailer payload | | | | | |
|---|---|---|---|---|---|---|---|---|---|---|---|
| | | Vol (ft$^3$) | Wt (lbs) | lbs/ ft$^3$ | Platen Pressure | L × W × H (bales) | # bales | lbs | % V | % W | Btu (×10$^6$) |
| 1a | 45 / 45 | 57 | 833 | 14.6 | ~4 psi | 9 × 2 × 3 | 54 | 45,000 | 86 | 100 | 191.8 |
| 1b | 45 / 30 | 57 | 997 | 17.8 | ~14 psi | 9 × 2 × 3 | 54 | 45,000 | 86 | 100 | 244.1 |
| 1c | 45 / 15 | 57 | 1148 | 20.5 | ~22 psi | 9 × 2 × 3 | 54 | 45,000 | 86 | 100 | 296.4 |
| 2a | 30 / 30 | 57 | 833 | 14.6 | ~16 psi | 9 × 2 × 3 | 54 | 45,000 | 86 | 100 | 244.1 |
| 2b | 30 / 15 | 57 | 997 | 17.8 | ~30 psi | 9 × 2 × 3 | 54 | 45,000 | 86 | 100 | 296.4 |
| 3a | 12.5 / 12.5 | 57 | 833 | 14.6 | ~32 psi | 9 × 2 × 3 | 54 | 45,000 | 86 | 100 | 305.2 |
| 3b | 12.5 / 12.5 | 57 | 713 | 12.5 | ~20 psi | 9 × 2 × 3 | 54 | 38,502 | 86 | 85 | 261.1 |
| 3c | 12.5 / 12.5 | 57 | 645 | 11.3 | ~14 psi | 9 × 2 × 3 | 54 | 45,000 | 86 | 77 | 236.2 |

In Table 2, row 1a summarizes the exemplary green bale cargo: fifty-four 64×48×32 inch bales of green switchgrass at 45% wwb, compressed to about 14.6 lb/ft$^3$, will essentially cube out the maximum transport weight while filling about 86% of the available transport volume (3072/(48×8.3×9)). At an energy value of 7,750 Btu per dry weight pound, this green bale cargo has a net energy value of about 192 million Btu.

Row 1b indicates that green switchgrass (45% wwb) that is baled to about 17.8 lb/ft$^3$, at a platen pressure of about 14 psi, compression, expansion, and friction properties of compressed plant biomass types needed to optimally design a tall grass biomass baler. By using a lab-scale baler rather than a full-scale machine, material and time were saved in testing and validating hypotheses. The scaling was modeled after the way forces and moments are scaled in homogeneous isotropic materials like steel and aluminum. Tall grass biomass under pressure can be approximated as an isotropic solid. The pressure-pressure relationships developed in the lab baler were incorporated as explained in Example 2 into a full-scale prototype design.

The lab-scale combined baling and infeed chamber measured 68.8 cm (27 inches) long, of which 49.5 cm (19.5 inches) was the enclosed baling chamber. The platen and end wall were 29.2×29.2 cm (11.5×11.5 inches).

The bulk of the lab baler structure was made from standard 1018 steel in the forms of 50×50×6.4 mm wall (2×2×¼ inch) tubing and 50×50×6.4 mm (2×2×¼) angle. The volume of the bale chamber and infeed chamber was encompassed by six sides. They consisted of three fixed sides, two sides that were part of the L shaped door, and the sixth side was formed by the compression platen. The bottom and right side both extended from the retracted platen to the end wall. While the corners of these sides were welded in place, the two rails of each side were formed by load beams that could sense force exerted perpendicular to the compression platen, either down or to the side. The opposite sides were formed by the door with the left side being full length, and the top being cut short to designate the infeed. The door was hinged along the lower left corner and clamped in two places opposite the hinge, one close to the infeed and one close to the end wall. The sides and ends of the chamber were slotted such that binding twine could be pushed or pulled around the bale in six places, three in each plane perpendicular to the platen motion. The platen and end wall each had nine evenly spaced posts to create the string passages around the ends of the completed bale.

Hydraulic fluid was moved by a Haldex Barnes Power Unit model number 1400011, with a 1.5 kW (2 HP) motor capable of moving 95 cc per second (1.5 gpm) at up to 13.8 MPa (2000 psi). The compression cylinder was controlled by an open center, manual, monoblock valve. For safety, the valve was positioned such that the operator could not have hands in the infeed or baling chamber while operating the valve. Compression was facilitated by an 8.9cm (3.5") bore by 45.7 cm (18") stroke 20.7 MPa (3000 psi) max cylinder. Maximum force was 85.6 kN (19250 pounds) and the cylinder fully extended in 30 seconds (1.5 cm or 0.6 inches per second). A pressure gauge and a pressure sensor were installed between the directional valve and the base of the cylinder, thus allowing the cylinder pressure to be monitored even when the flow from the pump stopped. A needle valve allowed a finely adjustable flow between the front and rear of the cylinder, and a ball valve allowed oil to escape from the front of the cylinder back to the tank when the direction control was in neutral. A second pressure gauge was located at the pump so pressure could be measured when the control was in reverse.

A wheel type linear position sensor was used to record the position of the platen while hydraulic pressure (from which paten pressure was calculated) and side force (from which Poisson's ratio effect was calculated) were measured. Sensors outputs were recorded simultaneously at 15 times per second.

EXAMPLE 2

Engineering Constraints for Rectangular Tall Grass Biomass Balers

FIG. 2 discloses the range of compression platen pressures requisite to compress tall grass biomass of various water contents to predetermined transport densities. This information can be used in two ways. The water content of winter killed tall grass biomass can be determined to select an appropriate curve for correlating platen pressure with a predetermined optimum transport density. Alternatively, this information can be used to predict the weight loss resulting from drying green tall grass biomass bales to lower water contents. In either case the biomass baler's compression system can be routinely fabricated to target the corresponding range of platen pressures requisite to achieve a desired range of transport densities.

In practice, expected bale densities are subject to some variability but, by mounting a conventional load cell under the baling chamber, the weight of the tall grass biomass going into a bale can be monitored during loading and flake formation, and the platen pressure adjusted to achieve a completed bale of targeted density. Acceptable variations in bale density will tend to average out when the bales are loaded into multiple-bale cargoes.

FIG. 3 discloses that tall grass biomass (switchgrass) exhibits a Poisson's ratio effect (PR) of approximately 22%. This physical property, which is substantially independent of water content, is required to calculate the minimum mechanical strength of a baling chamber for producing tall grass biomass bales at the requisite platen pressures. The distributed force on the back wall is equal to the force of the platen ($P_p \times A_p$), but the force resisted ($F_w$) by the other baling chamber walls must be at least equal to:

$$F_w = PR \times P_p \times A_w$$

wherein $F_w$ is the distributed load against any one of the chamber walls selected from among the upper wall, the lower wall, and either one of the sidewalls of the rectangular baling chamber, $P_p$ is the maximum pressure that the baler can apply by the compression platen, and $A_w$ is the area of the selected wall. Substituting for the observed Poisson's ratio of compressed tall grass biomass, then:

$$F_w \geq 0.22 \times P_p \times A_w$$

wherein $A_w$ is expressed in square inches.

In conventional practice, baler manufacturers will add standard factors of safety to such calculated design constraints, as described in the literature, e.g., Shigley 1963. SF is a predetermined design loading multiplier to ensure that the operational loading is not greater than the design loading. In a representative embodiment, such a calculated upper limit for sidewall strength ($0.22 \times P_p \times A_w$) may be multiplied by the same safety factor that the manufacturer chooses to use for the compression platen, in which case SF as applied to the sidewalls is calculated by dividing the predetermined design failure load of the compression platen by the maximum pressure that the baler can operationally apply by the compression platen ($P_p$), such that the design upper limit of the sidewalls is ($0.22 \times P_p \times A_w \times SF$).

Bale ejection requires that sufficient force be applied against the bale to overcome the total frictional forces ($F_f$) that the compressed tall grass biomass applies to the chamber walls (typically steel) that contain it during ejection. We determined that the coefficient of friction of compressed tall grass tall grass biomass is approximately 0.40 and decreases as the water content of the biomass decreases. Optionally, coating the baling chamber walls with a low friction material will reduce the applicable $F_f$ value.

For ejection through an open or opened back chamber wall, the bale applies frictional forces against the upper wall, the lower wall, and the two sidewalls. For side ejection, the ejection system must overcome the frictional forces against the platen, lower wall, back wall, and upper wall. Top or bottom ejection systems would be designed to overcome the frictional forces against the platen, back wall, and sidewalls.

The frictional force that the bale applies against any one of the chamber walls is expressed as $F_f = F_n \times C_f$ where $F_n$ is the normal force (calculated below) and $C_f$ is the coefficient of friction of compressed tall grass biomass on the wall material.

Considering rear ejection, the pressure ($P_w$) that the compressed bale applies against the upper, lower, and two sidewalls is equal to the platen pressure times the Poisson's ratio, or $P_w = P_p \times PR$. Alternatively, $P_w$ can be expressed as the normal force divided by the area of the wall, $P_w = F_n/A_w$.

Assume that the area of the upper and lower walls is L×W; and that of the sidewalls is L×H. Then for each sidewall, $P_w = F_n/(L \times H)$, which converts to $F_n = P_w \times L \times H$. Substituting for $P_w$, then $F_n = P_p \times PR \times L \times H$. Accordingly, for each sidewall:

$$F_f = F_n \times C_f$$

$$F_f = P_p \times PR \times L \times H \times C_f$$

Similarly, for the upper and lower walls:

$$F_f = P_p \times PR \times L \times W \times C_f$$

In combination, then, the cumulative frictional forces during rear ejection are:

$$F_f \text{total for rear ejection} = 2(P_p \times PR \times L \times H \times C_f) + 2(P_p \times PR \times L \times W \times C_f).$$

Pursuant to this disclosure, for tall grass biomass the PR is 0.22 and $C_f$ is 0.4. Thus, the rear ejection system should control the compression platen to apply at least the following force (in pounds, when L, W, and H are expressed in inches) to eject the bale through the back wall of the baling chamber:

$$F_f \text{total for rear ejection} = 2(P_p \times 0.22 \times L \times H \times 0.4) + 2(P_p \times 0.22 \times L \times W \times 0.4)\ (0.176 \times P_p \times L \times H) + (0.176 \times P_p \times L \times W)\ (0.176 \times P_p \times L)(H+W).$$

For side ejection, the platen and back wall are compressed to the platen pressure, and so for these "sides" of the ejected bale:

$$P_p = F_n/A_p, \text{ or } F_n = P_p \times W \times H.$$

However, the Poisson's ratio effect still applies to the $F_f$ values for the upper and lower walls, as calculated above. Thus, in combination:

$$F_f \text{total for side ejection} = 2(P_p \times W \times H \times C_f) + 2(P_p \times PR \times L \times W \times C_f)\ 2(P_p \times W \times H \times 0.4) + 2(P_p \times 0.22 \times L \times W \times 0.4)\ (0.8 \times P_p \times W \times H) + (0.176 \times P_p \times L \times W)\ (P_p \times W)(0.8H + 0.176L).$$

Similarly, top or bottom ejection must overcome the frictional forces against the platen, back wall, and sidewalls. Combining these forces in the manner calculated above, the $F_f$ total for top or bottom ejection of a tall grass biomass bale compressed to optimum transport density equals at least:

$$F_f = 2(P_p \times W \times H \times C_f) + 2(P_p \times PR \times L \times H \times C_f)\ 2(P_p \times W \times H \times 0.4) + 2(P_p \times 0.22 \times L \times H \times 0.4)\ (0.8 \times P_p \times W \times H) + (0.176 \times P_p \times L \times H)\ (P_p \times H)(0.8W + 0.176L).$$

Most preferably, the baler compression system is configured to compact the tall grass biomass material with a platen pressure between about 22 and 30 psi. This optimal range, for the most common case of delivery by highway-legal trucks, encompasses the exemplary dry-down strategies disclosed in the Table 2 above. The baler compression system will typically incorporate one or more hydraulic cylinders to advance the platen and thereby compact the tall grass biomass material within the baling chamber. The hydraulic system is preferably adjustable by conventional controls to encompass all or a substantial part of this optimal range, in order to permit the operator to select an appropriate platen pressure to achieve a predetermined bale density, taking into consideration initial moisture content, expected dry-down period, and mode of transportation.

The invention accordingly permits an optimized tall grass biomass transport system including a fleet of semi-trailer trucks that are reversibly loaded at transport intervals with cargoes of parallelepiped bales of tall grass biomass, wherein the aggregate weight of the loaded bales is at least 80% of the aggregate maximum cargo weight capacities of the loaded semi-trailer trucks, and wherein the aggregate volume of the bales is at least 80% of the aggregate maximum cargo volume capacities of the loaded semi-trailer trucks. The trucks are preferably loaded to at least 85%, and most preferably to at least 90%, of their legal payloads. To further reduce transportation costs, the tall grass biomass bales should be dried before long-haul transport to average moisture contents of less than 30%, preferably less than 20%, and most preferably less than 15%.

In this manner, conventional semi-trailer trucks can be routinely loaded with tall grass biomass payloads having net energy values of around 240 million Btu or more, for economical transport over highway distances of several hundred miles.

One of ordinary skill in the art will readily understand and appreciate that the platen pressure v. bale density relationships disclosed in FIG. 2 are just as useful, mutatis mutandis, to predictably and reproducibly produce bales of tall grass biomass at predetermined lower transportation densities for short haul or barge transportation, as well as at higher densities for long-haul transport by rail or ship. The cost of hauling the extra air content of low-density bales by barge or short-haul truck is relatively low, and that incremental cost may be more than offset by lower fossil fuel consumption in the baling process. Trains and ships have more constrained payload volumes than barges, and maximum higher payload weights than trucks, and so their cargoes can be cubed out at maximum payload by baling at higher platen pressures, in the substantially constant slope regions of the tall grass biomass curves in FIG. 2. Moreover, FIG. 3 indicates that throughout the noted compression ranges the observed Poisson's ratio of 0.22 applies.

CITATIONS

Austin, A., Researchers evaluate biomass handling solutions, Biomass Magazine, posted Dec. 16, 2009.

Kemmerer, B. D., and J. Liu, Spring switchgrass harvest with a New Holland large square baler, ASABE Paper No. 1009029, Jun. 21, 2010.

Dooley, J. H., et al., Utilization of biomass from WUI fuels reduction: Biomass collection and handling from wildland-urban intermix projects on residential and suburban properties; Poster presented at SmallWood 2006, Richmond, Va., May 16, 2006.

Lanning, D. N., et al., Engineering factors for biomass baler design; ASABE Paper No. 078047, presented at the 2007 ASABE Annual International Meeting, Minneapolis, Mich., Jun. 17-20, 2007.

Dooley, J. H., et al., Biomass baling into large square bales for efficient transport, storage, and handling; paper presented at the Council on Forest Engineering 2008: 31st Annual Meeting, Charleston, S.C., June 22-25, 2008.

Dooley, J. H., et al., Square bales of woody biomass for improved logistics, paper presented at the 2009 Society of American Foresters National Convention, Orlando, Fla., Sep. 30, 2009.

Fuel Value Calculator, USDA Forest Products Laboratory, 2004. http://www.fpl.fs.fed.us/documnts/techline/fuel-value-calculator.pdf Shigley, J. E., Mechanical Engineering Design, McGraw-Hill Series in Mechanical Engineering, pp. 210-214, 1963.

While the preferred embodiment of the invention has been illustrated and described, it will be appreciated that various changes can be made therein without departing from the spirit and scope of the invention.

We claim:

1. A rectangular switchgrass bale having a bale density of between 14.6 and 20.5 lb/ft$^3$ produced by a process of compacting a harvested switchgrass biomass material at between about 22 and about 32 psi into a rectangular switchgrass bale having a bale density of between 14.6 and 20.5 lb/ft$^3$.

2. The rectangular switchgrass bale of claim 1 wherein the bale is 3×4×8 feet and weighs between 1,402 and 1,968 pounds.

3. The rectangular switchgrass bale of claim 1 comprising whole stalks or billets.

* * * * *